March 17, 1931.   J. M. G. FULLMAN   1,796,781
FASTENING MEANS FOR SEPARABLE PARTS
Filed July 16, 1929
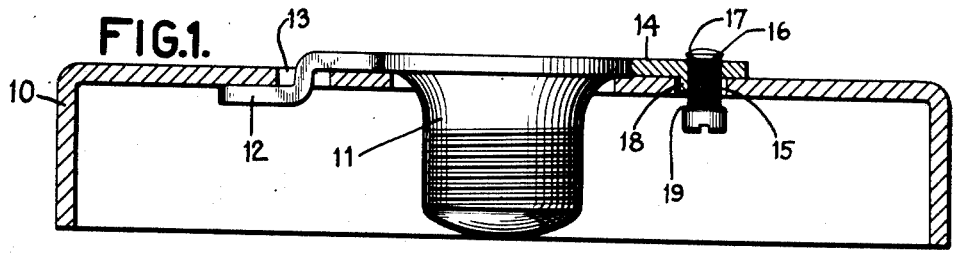
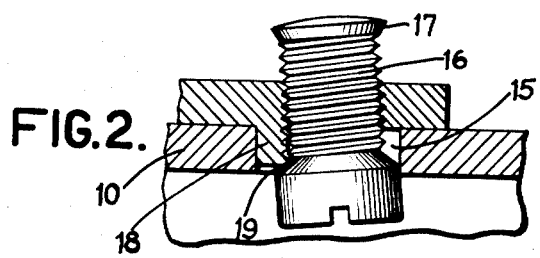
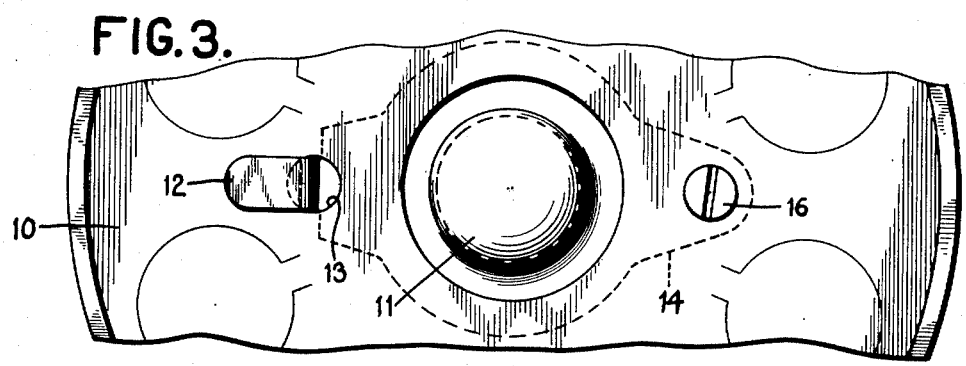
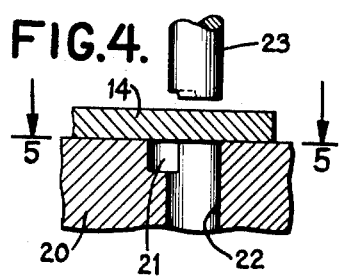
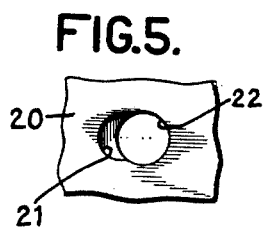
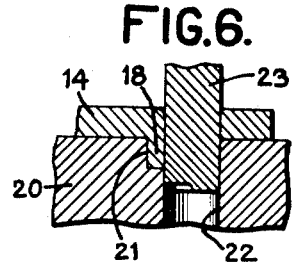
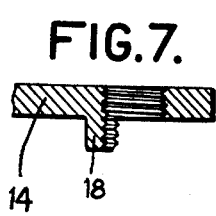
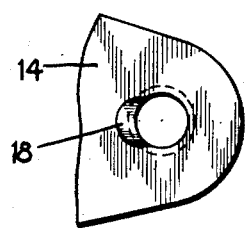
Inventor
James M. G. Fullman
By his Attorneys
Cooper, Kerr & Dunham Patented Mar. 17, 1931

1,796,781

UNITED STATES PATENT OFFICE

JAMES M. G. FULLMAN, OF SEWICKLEY, PENNSYLVANIA, ASSIGNOR TO NATIONAL ELECTRIC PRODUCTS CORPORATION, OF NEW YORK, N. Y., A CORPORATION OF DELAWARE

FASTENING MEANS FOR SEPARABLE PARTS

Application filed July 16, 1929. Serial No. 378,711.

This invention relates to improvements in the construction shown and described in the copending application of H. A. Calderwood, Serial No. 336,809, filed February 1, 1929. In that application a construction was disclosed in which provision was made for the securing together of the separate parts of a device such as a fixture stud in such a way that separation of the parts could be effected without the necessity of wholly removing or replacing screws. According to the disclosure of that application, a screw which engaged in threads in one part was adapted to expand a separate collar or bushing into cooperation with another part to thereby secure the parts together.

The present invention has for its object the provision of a construction which will permit the dispensing with the use of a separate collar member or expansible bushing and in lieu thereof one part is provided with an integral extension which is adapted to cooperate with the screw and to cause it to be displaced to such a position that the two parts will be secured together.

Further and other objects will be hereinafter set forth in the accompanying specification and claims and shown in the drawings which by way of illustration show a preferred embodiment of the invention.

In the drawings:

Fig. 1 is a transverse sectional view of a fixture stud and supporting box incorporating my improvement;

Fig. 2 is an enlarged detail view of the parts shown in Fig. 1, but with the screw tightened so as to be in locking position;

Fig. 3 is a bottom view of the parts shown in Fig. 1;

Figs. 4 to 8 inclusive show various steps in the fabrication of the extension part upon the fixture stud.

In more detail I have shown my improved fastening means as used to fasten together one part such as an outlet box 10 with another part such as a fixture stud generally designated 11. The latter comprises a lug or ear 12 which dips through an opening 13 in the outlet box and extends under the bottom of the top plate of the box. The part 11 also comprises an extended portion or overlying part 14 disposed over the top of the outlet box or underlying part, which part 14 is provided with a threaded opening to receive a fastening screw. Such part 14 is relatively inaccessible, being covered from below by the outlet box which is provided with an opening or aperture 15. In lieu of using a screw with a large head so as to extend over the marginal edges of opening 15 as heretofore, a screw such as 16 is provided having a screw slotted head of reduced size so that it can pass through opening 15 when the screw is backed off. The screw slot in the head of the screw is accessible from below the underlying part 10 to provide for the turning of the screw from an accessible position below the underlying part 10. After the screw 16 is threaded into and assembled into part 14 of the fixture stud, the upper end of the screw is upset as shown at 17, so that it is subsequently impossible to unscrew 16 completely out of 14. In lieu of using an expansible bushing or expansible member within the opening 15 as was provided heretofore in the construction disclosed in the aforesaid Calderwood application, I provide part 14 with an integral extension or tongue portion designated 18. Such tongue portion extends downwardly into the opening 15 as clearly shown in Figs. 1 and 2. Figs. 4 to 8 inclusive, show the manner of forming this tongue portion. In the fabrication of the fixture stud, the part 14 is placed over a die 20, Fig. 4, provided with a recess or cavity 21 in addition to the round opening 22. 23 represents the punch. On passing the punch through the extension portion 14 of the fixture stud, the extension 18 is pressed down into the cavity in the manner shown in Fig. 6. Subsequently the part 14 is tapped with a screw thread as shown in Fig. 7.

The screw 16 is provided with bevelled wedging surfaces generaly designated 19.

When in use and when it is desired to disassemble the box and fixture stud, the screw 16 is backed off. The screw 16 can then freely pass through the opening 15. To assemble the parts and secure them together, the head of the screw 16 is passed through the opening 15 and then tightened. The tightening operation is continued until the wedging surfaces 19 of the screw abut the tongue-like extension 18. When such engagement occurs, the bevelled portions 19 of the screw wedge against the tongue and crowd the screw to the right in Fig. 2 and also cause a slight tipping of the screw in the screw threads which are relatively loose. The effect of this action is to displace the head of the screw to such an extent to the right that it will engage the further side of the opening 15 away from the tongue 18 and thus clamp 14 to 10. It will be understood that with the screw in the tightened and displaced position, that the head of the screw will be displaced from such a position in which it can pass freely through 15 and when in such displaced position the screw 16 will securely clamp 14 to the box 10.

By the use of this construction loose parts are obviated. The expansible collars heretofore provided are dispensed with and the construction which is afforded is cheap and inexpensive to manufacture.

What I claim is:

1. A fastening means for separable parts, which parts include one part overlying another underlying part, said latter part being provided with an aperture, said fastening means comprising a screw having a relatively loose but threaded engagement with the overlying part so as to be adapted to tip with respect to the overlying part, said screw having means therein accessible from below the underlying part to provide for the screw being turned to advance it in or out with respect to the overlying part into which it is loosely threaded, an integral extension upon the overlying part projecting into the aperture in the underlying part, and said screw having a wedging portion to cooperate with the extension and to thereby tip itself into clamping relation with the underlying part.

2. The invention set forth in claim 4 in which the fastening screw is provided with an enlarged head portion which is proportioned to pass freely and entirely through the aperture in the underlying part when the head of the screw is out of wedging cooperation with the extension from the overlying part.

3. A fastening means for separable parts which parts include one underlying part provided with an aperture and another part overlying the first mentioned part and provided with screw threads to loosely receive a fastening screw, said overlying part having an integral extension adapted to project into the aperture of the underlying part alongside one side only of the shank of the screw, said screw having an enlarged head portion proportioned to pass entirely through the aperture in the underlying part when the screw is backed off and having a portion adapted to cooperate with the extension when the screw is tightened up to tilt the screw in the loose threads of the overlying part into a laterally displaced position in which its head portion cannot pass through the aperture in the underlying part.

4. A fastening means for separable parts including a screw member loosely threaded into one part and having an enlarged head portion adapted to freely pass entirely through an aperture in another part, and an extension upon the part into which the screw is threaded and also projecting into the aperture in the other part, said screw having its head portion adapted for wedging cooperation with the extension and wall of said aperture to secure the parts together upon tightening of the screw.

In testimony whereof I hereto affix my signature.

JAMES M. G. FULLMAN.

CERTIFICATE OF CORRECTION.

Patent No. 1,796,781.   Granted March 17, 1931, to

JAMES M. G. FULLMAN.

It is hereby certified that error appears in the printed specification of the above numbered patent requiring correction as follows: Page 2, line 46, claim 2, for the numeral "4" read 1; and that the said Letters Patent should be read with this correction therein that the same may conform to the record of the case in the Patent Office.

Signed and sealed this 14th day of April, A. D. 1931.

(Seal)

M. J. Moore,
Acting Commissioner of Patents.